United States Patent [19]

Streib

[11] 4,434,418
[45] Feb. 28, 1984

[54] ULTRASENSITIVE APPARATUS AND METHOD FOR DETECTING CHANGE IN FLUID FLOW CONDITIONS IN RELIEF FLOWLINES ASSOCIATED WITH A CHEMICAL OR REFINERY COMPLEX

[75] Inventor: Stephen F. Streib, Novato, Calif.

[73] Assignee: Chevron Reserach Company, San Francisco, Calif.

[21] Appl. No.: 184,560

[22] Filed: Sep. 5, 1980

[51] Int. Cl.$^3$ .......................... G08B 21/00; G01F 1/68
[52] U.S. Cl. ...................................... 340/606; 73/195; 73/204
[58] Field of Search ............ 340/606; 73/190 H, 204, 73/195; 374/29, 30

[56] References Cited

U.S. PATENT DOCUMENTS

| | | | |
|---|---|---|---|
| 2,729,976 | 1/1956 | Laub | 73/204 |
| 2,808,580 | 10/1957 | Fuller | 340/606 |
| 3,431,149 | 3/1969 | Webb | 374/29 X |
| 3,821,895 | 7/1974 | Sumikawa et al. | 73/190 H |
| 4,102,196 | 7/1978 | Holtermann | 73/190 H |
| 4,198,859 | 4/1980 | Holtermann | 374/30 |

FOREIGN PATENT DOCUMENTS

| | | | |
|---|---|---|---|
| 44368 | 12/1934 | France | 73/204 |
| 587996 | 5/1947 | United Kingdom | 374/29 |

*Primary Examiner*—John W. Caldwell, Sr.
*Assistant Examiner*—Daniel Myer
*Attorney, Agent, or Firm*—H. D. Messner; Edward J. Keeling

[57] ABSTRACT

Transient change in heat flux due to ultrasmall variation in flow conditions (say from no flow-to-flow) within a series of relief flowlines forming a component part of a flaring system associated with a chemical or refinery complex, is surprisingly useful in pinpointing a source of plant upset. Result: corrective action can be undertaken. In one aspect, the change in flux is monitored within each major relief flowline using a heat flux transducer-meter in series with signal indicating means, such as a recorder and/or an audio-alarm system. Cascading the signal output, i.e., serially combining the outputs of N thermocouples of the transducer-meter, enhances sensitivity. In a preferred case, N is about 80 but can be as high as 320, if desired.

9 Claims, 5 Drawing Figures

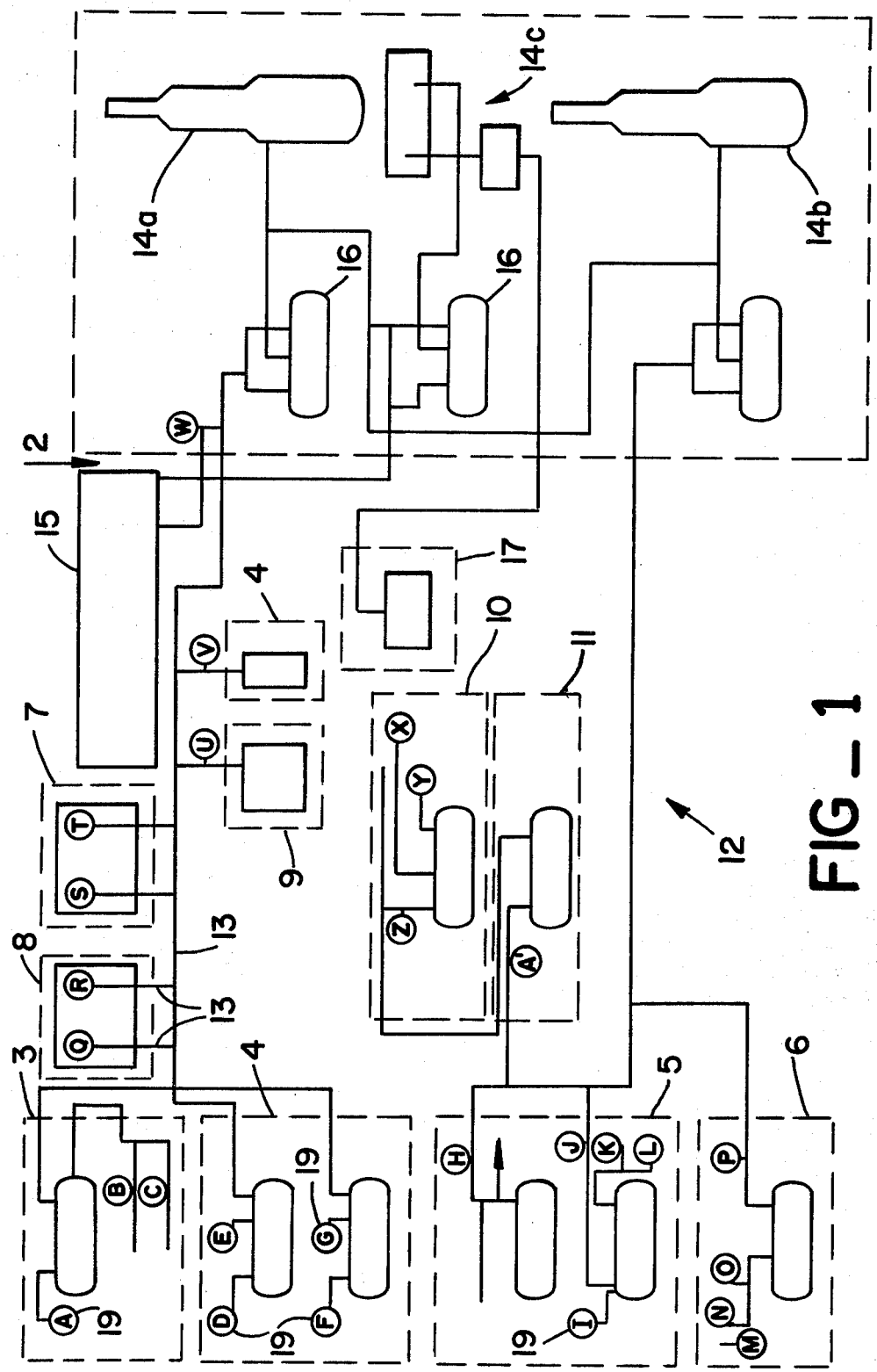
FIG_1

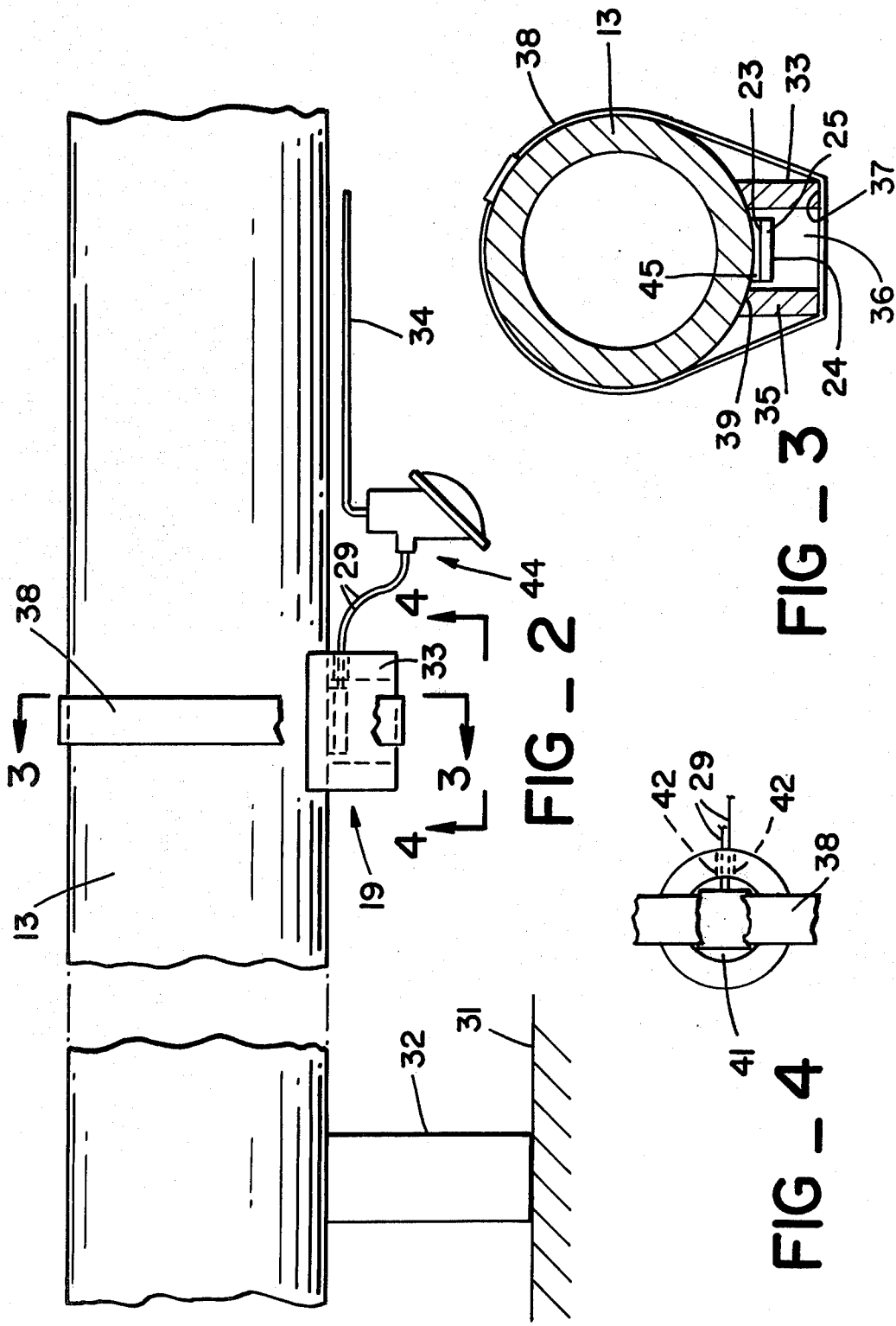

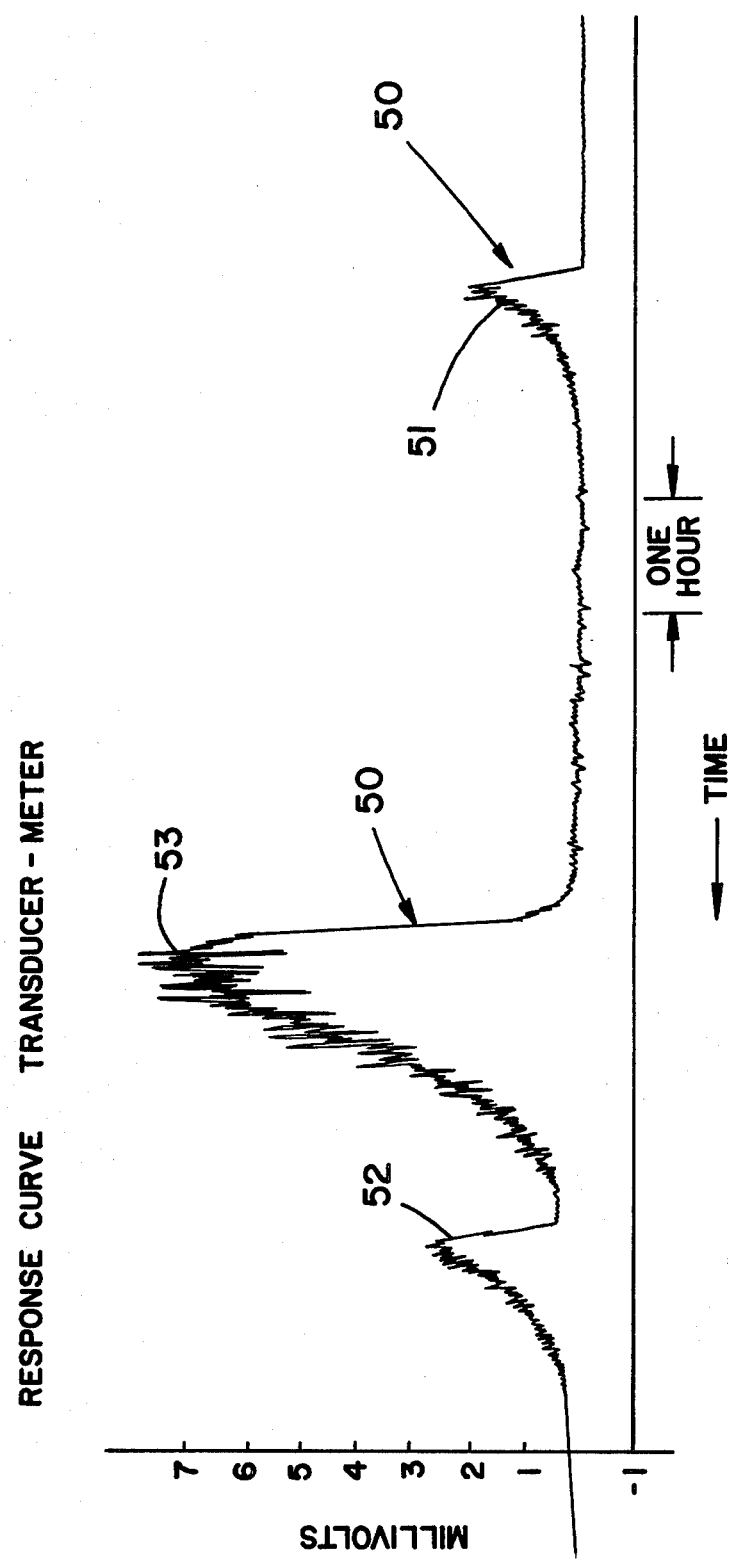

4,434,418

ULTRASENSITIVE APPARATUS AND METHOD FOR DETECTING CHANGE IN FLUID FLOW CONDITIONS IN RELIEF FLOWLINES ASSOCIATED WITH A CHEMICAL OR REFINERY COMPLEX

SCOPE OF THE INVENTION

This invention relates to an ultrasensitive but inexpensive apparatus and method for sensing small changes in heat flux due to corresponding low flows of fluid within a body under varying conditions, especially a transient condition in which such fluid flow unexpectedly occurs. The invention has particular application in indicating the unexpected occurrence of fluid flow within a relief flowline or series of such lines, in a chemical of refinery complex.

RELATED APPLICATIONS

My following applications, filed simultaneously herewith, are incorporated by reference:
(i) "Ultrasensitive Apparatus and Method for Detecting Change in Fluid Flow, Especially During the Occurrence of a Transient Condition", Ser. No. 184,559, filed Sept. 5, 1980; and
(ii) "Ultrasensitive Apparatus and Method for Detecting Change in Fluid Flow Conditions in a Flowline of a Producing Oil Well, or the Like", Ser. No. 184,558, filed Sept. 9, 1980.

BACKGROUND OF THE INVENTION

The art of detection of fluid flow is replete with different classifications of inventions indexed for different purposes, say based on type of use involved versus their principles of operation. While detection of change in flow of fluids (under flow/no-flow conditions) using transient heat transfer principles may have occurred, I am unaware of any detector or method which has cascaded the output effect to detect an ultrasmall change in flow conditions under a variety of occurrences, especially say from a heat sensing position completely exterior of the fluid-carrying body while maintaining the integrity of the interior of the body intact, i.e., without providing openings through the body itself.

SUMMARY OF THE INVENTION

In accordance with the present invention, transient change in heat flux due to a small variation in flow conditions (say from no flow—to flow) within a relief line or series of relief flowlines forming a component part of a relief-flare system associated with a chemical or refinery complex, is surprisingly useful in pinpointing a source (or sources) of plant upset. Result: corrective actions can be efficiently undertaken, as required.

In apparatus aspect, the change in heat flux associated with a change in fluid flow (either in gas or liquid phase, or both) is monitored within each major relief line associated with the refinery or chemical complex using a series of heat flux transducer meters in series with signal indicating means such as a series of recorders and/or an audio alarm system. Background level is reduced by surrounding each transducer-meter with a weathering bonnet attached to an associated relief line. Cascading the signal output of the transducer-meter, i.e., serially combining the outputs of N thermocouples in thermopile fashion, enhances sensitivity. In a preferred mode N is about 80 but can be as high as 320, if desired. In the method aspects, performance is further enhanced by attaching the transducer-meter of the present invention to the relief flow line via a heat conducting adhesive. Result: a further reduction in background signal level. Cascading the signal output from the transducer-meter then can provide sensitivities in a range, say from 7 to 250 BTU's/hr/ft$^2$ per millivolt output.

DESCRIPTION OF THE DRAWINGS

FIG. 1 is a schematic diagram of a series of relief flowlines forming a component part of a relief flare system associated with a refinery or chemical complex, in which a plurality of heat flux transducer-meters are located at particular points within the relief-flare system in order to pinpoint a source (or sources) of plant upset;

FIG. 2 is a side elevational view of one of the relief flowlines of FIG. 1 illustrating attachment and operation of an individual transducer-meter of FIG. 1 in accordance with the present invention;

FIG. 3 is a sectional view taken along line 3—3 of FIG. 3;

FIG. 4 is a detailed view of the transducer-meter of the present invention taken in the direction of line 4—4 of FIG. 2; and FIG. 5 is an actual plot of the signal output of an individual transducer-meter of FIG. 1, versus time.

DESCRIPTION OF AN EMBODIMENT OF THE INVENTION

Reference should now be had to FIG. 1 illustrating the present invention in a particular useful environment, viz, in monitoring fluid flow conditions within relief-flare system 2 associated with process units 3–11 of refinery complex 12. By monitoring the downstream side of a series of flow lines 13 comprising a component part of relief-flare system 2, as described hereinafter, an operator (or operators) can promptly pinpoint any source (or sources) of plant upset within the refinery complex 12, and initiate corrective action, as necessary.

Of course, the refinery complex 12 is theoretically designed to remain in dynamic balance during all operations. Flow rates of feedstock and refinery products for example, can be stabilized vis-a-vis various processing-treatment operations associated with units 3–11. Result: feedstock-product balance within each unit 3–11 can usually be easily maintained acceptable limits, such as at hexane unit 2, crude units 4, catalytic cracking unit 5, catalytic reformers 6 and 7, hydrocracking unit 8, hydrogen plant 9, alkylation unit 10, and pretreatment unit 11.

Momentary upsets do occur however. Varying amounts of "upset" product fluids can be generated at the various units on both a periodic and aperiodic basis. These fluids (both in gas or liquid phase, or both) are purged from system 12 via the relief-flare system 2. Pressure is the control variable monitored. When one or more of the units 3–11, for example, become unbalanced, increases in pressure within the relief-flare system 2 is used to successfully initiate relief-flaring operations. But it remains for an operator to pinpoint the source (or sources) of the unbalanced operations within the complex 12. That is to say, an operator must determine where the upset has occurred and then initiate corrective action, as required. (Prolonged flaring and/or attendant odor problems caused by plant upsets can bring the refining operation into violation of Federal and State laws.)

In accordance with the present invention, relief-flare system 2 (which includes (i) a series of relief flowlines 13 previously mentioned, connected to various process units 3-11 as well as to (ii) flare units 14a-14c, (iii) compressor network 15, (iv) knock-out drums 16 and (v) storage network 17) is augmented by a series of relief flow transducers-meters generally indicated at 19 located at strategic positions within the relief-flare system 2 say at positions A, B, . . . A' of FIG. 1. Result: unbalanced units within the refining complex 12 can be easily identified and corrective action quickly undertaken, as needed.

However, before discussing operations of the transducer-meters 19 of the relief-flare system 2 in detail, perhaps a closer look at the operations of refinery complex 12 is in order.

First, it should be evident from inspection that FIG. 1 is not a typical feedstock-product flow diagram, but instead focuses on relief operations of the units 3-11. Hence, only a generalized discussion of the individual processing operations of the units 3-11 seems necessary to wit:

After the crude oil feedstock has been degassed, dewatered, and heated, operations can be initiated at crude units 4 after entry of the feedstock. After completion of the distillation process at units 4, further refining (of the products and residuum oil of distillation) can occur, say at catalytic cracking unit 5 and/or hydrocracking unit 8. At units 5 and 8 molecules of the introduced fluids are reduced in size and/or provided with additional hydrogen to increase, inter alia, yield. Catalytic reformer units 6 and 7 improve produce quality as by improving octane number; alkylation unit 10 in combination with pretreatment unit 11 (to protect its catalyst) provide additional processing steps such as to change the lower molecular weight hydrocarbons into higher molecular weight hydrocarbons. Thus for example, units 10 and 11 can be used to change olefins into isoparaffins. Hexane unit 3 and hydrogen plant 9 are associated units of the refining process adding feedstock and/or catalytic by-product capacity to various process units as required. The hexane product, for example, can be used in the blending of aviation gasoline, while the hydrogen from plant 9 is used in various process capacities, as required.

OPERATION OF TRANSDUCER-METER 19

Operation of the flux transducer-meter 19 in the present invention is shown in FIGS. 2, 3 and 4 and in general is a somewhat conventional application of thermopile principles in which a temperature difference (delta-T) between thin metallic layers or plates 23 and 24, see FIG. 3, connecting to a plurality of N thermocouples etched on insulating board 25, causes the combination to generate a potential signal proportional to delta-T. That is to say, both plates 23 and 24 and the plurality of N thermocouples form elements of the aforementioned thermopile circuit by which the signal outputs are cascaded. Result: a surprisingly sensitive millivolt output is produced proportional to the heat flux passing through the transducer-meter 19 as a direct function of change in fluid flow within the relief line 13 (either in gas or liquid phase, or both). (In this regard N is preferably about 80 but can be equal to 320, if desired.)

Calibration of the transducer-meter 19 is required, and usually each meter 19 is provided with a separate calibration curve and temperature correction curve. In this regard a particular adaptable transducer-meter 19, including useful calibration and correction curves, is manufactured by International Thermal Instrument Company, Del Mar, Calif., to the following specification:

Temperature range: $-425°$ F. to $550°$ F.
Material: Polyimide-glasses
Max Flux Density: $10^6$ BTU/Hr Ft$^2$
Time Constant: 1 Second (Approx)
Output Resistance: 30 Ohms to 500 Ohms
Sizes: $\frac{1}{4}'' \times \frac{1}{2}''$ to $4'' \times 4''$
Accuracies: 10% to 1%
Sensitivities: 7 to 250 BTU/Hr/Ft$^2$/Mv Note that in the depicted transducer-meter 19 of FIGS. 2–4, its associated recorder or audio-alarm circuit is not pictured. However, the latter is always electrically connected to the transducer-meter 19 via conductors 29. Centrally locating a plurality of recorder and/or alarm circuits to a multiplicity of improved transducer-meters 19 allows a single operator (at the central location) to monitor flow conditions of several relief flowlines simultaneously. The type of flow condition that is individually monitored, however, varies with the application involved.

For example, in FIG. 2 the flowline 13 is seen to be elevated above ground surface 31 via the conventional pipe support 32. Also supported above ground surface 31 on the flowline 13 are shielding bonnet 33 (placed about the transducer-meter 19) at the underside of the line 13 relative to the direction of gravity, as well as conduit 34 in which conductors 29 are located.

FIGS. 3 and 4 illustrate bonnet 33 in more detail.

As shown in FIG. 3, bonnet 33 is cylindrical and includes a sidewall 35 forming a cavity 36 open at endwall 37 but closed at its opposite end in contact with the relief line 13. Strap 38, circumferentially stretching about the relief line 13 semipermanently supports the bonnet 33 relative to the line 13.

Since it is desirable to have a large thermal resistance at its contact surface with the line 13, boundary 39 of the bonnet 33 can be gnarled to increase the number of air spaces in the plane of the endwall.

To avoid further thermal interference with each transducer-meter 19 of the present invention, the bonnet 33 is also centered about the former (but avoids direct metal-to-metal contact therewith) by having a somewhat annular air space 41 therebetween, see FIG. 4. Sidewall 35 of the bonnet 33 is also provided with openings 42, through which the electrical conductors 29 extend, see FIG. 4. These electrically connect each transducer-meter 19 with its associated recorder and/or alarm circuit, as previously discussed.

The size of the openings 42 can be enlarged to fit snugly about the conductors 29 as desired. In that way, rain, moisture, or other environmental factors can be somewhat inhibited from directly contacting each transducer-meter 19 of the present invention, during operations thereof. Hence, the latter's operations remain stable once calibration has occurred and its background signal level correspondingly remains at a minimum level.

Note also that the conductors 29 can include a receptacle 44 (FIG. 2) so as to allow easy relocation of the bonnet-transducer assembly from place to place along the line 13, as required. At the other end of the receptacle 44 is the ultimate destination of the conductors 29: The system recorder and/or alarm circuit previously mentioned.

In order to further minimize background noise level, each transducer-meter 19 of the present invention must be firmly attached to the line 13. In this regard a conventional heat conductor adhesive 45 (see FIG. 3) having a high conductivity value such as between 15–20 BTU's per hour per square foot per degree F. per inch of thickness can be used. In this regard, an adhesive manufactured by Thermon Manufacturing Company, San Marcus, Tex., under the trade name "Thermon" has proven adequate in all applications.

To provide a permanent record for operator perusal, the non-depicted recorder can be of the potentiometric type and include a mechanically driven stylus which charts amplitude or the cascased signal outputs from each transducer-meter 19 as a function of time, in the manner of FIG. 5.

Note in FIG. 5 that curve 50 charts output signal level from a transducer-meter 19 in an actual application, as a function of time (in hours). In the application shown, medium peaks 51 and 52 occur early and late, respectively, in the depicted monitoring cycle, while large peak 53 occurs during the middle of the same cycle.

Each peak 51, 52 or 53 signifies that flow of fluids had occurred within the flowline under survey (where the particular transducer-meter 19 had been attached) over the period of time designated. Slopes of the peaks 51, 52 or 53 are also of interest. Since they vary rather slowly with time, they indicate that heat flow proportional to fluid flow was in a transient mode as opposed to a steady state condition. (That is to say, temperatures associated with fluid flow vary rather slowly with time over the periods of interest at the boundaries of interest. See pages 275–277 "PRINCIPLES OF ENGINEERING HEAT TRANSFER", Warren H. Giedt, Van Nostrand Company, Inc., Princeton, N.J., 195, as well as applicant's application Ser. No. 184,559 at page 6, lines 22 et seq previously cited. In this regard, by the term "transient", not only should be the reader envision typical thermal conditions or circumstances that the term usually describes, but also should conceive of external circumstances such as where rain, humidity and wind, for example, would combine to bring about such a state. Each transducer-meter 19 of the present invention is contemplated as bein located out-of-doors; hence, such environmental factors are of importance.)

Although the invention has been described in terms of specific embodiments set forth in detail, it should be understood that such description is by way of illustration only and the invention is not necessarily limited thereto since alternatives will be readily apparent to those skilled in the art, but rather by the scope of the following claims.

What is claimed is:

1. Method of providing detection of fluid flow in a series of relief flowlines of a relief-flare system associated with process units of a chemical or refinery complex whereby sources of relief discharge therein can be pinpointed comprising:
   (a) positioning heat flux sensing transducer-meter means exterior of but in heat conducting contact in at least one of said flowlines while maintaining integrity of said at least one flowline intact;
   (b) monitoring change in fluid flow in said at least one flowline, by generating a transient cascaded output signal proportional to transient variation in heat flux detected exterior of said at least one flowline at said transducer-meter; and
   (c) indicating the occurrence of said transient cascaded signal output so as to pinpoint location of relief discharge from one or more associated process units of said chemical or refinery complex.

2. Method of claim 1 in which said step of positioning said heat flux sensing transducer-meter means includes placing a multiplicity of said transducer-meters in sufficient numbers and at selected locations within said relief-flare system, so as to isolate sources of relief discharge from any other source.

3. Method of claim 2 in which said step of positioning said multiplicity of heat flux sensing transducer-meters in said relief-flare system includes for each of said meters:
   (i) bonding one of two metallic plates of each transducer-meter in serial connection with N thermocouples (thermopile fashion) to a sector of a selected flowline using an adhesive having a high thermal conductivity value wherein minute fluid flow at the interior of said sector is easily detected.

4. Method of claim 3 with the additional substep of:
   (ii) surrounding said heat flux sensing transducer-meter with a weathering bonnet attached in substantially non-heat conducting contact with said at least one flowline, and having a cavity fitted about said transducer-meter, said transducer-meter having a predetermined background noise level, said bonnet reducing said background level to an acceptable level.

5. Method of claim 3 in which thermal conductivity of said adhesive is at least 15 BTU/hr/ft$^2$/°F. per inch of thickness.

6. Method of claim 3 in which thermal conductivity of said adhesive is in a range of 15–20 BTU/hr/ft$^2$/°F. per inch of adhesive thickness.

7. Method of claim 1 in which said step of monitoring change in fluid flow includes the precursor step of calibrating output of said transducer-meter means to a preselected set point level whereby deviations therefrom due to change in fluid flow in said at least one flowline can be detected.

8. Method of claim 1 in which said fluid flow to be detected is in a gas phase.

9. Method of claim 1 in which said fluid flow to be detected is in both liquid and gas phases.

* * * * *